(12) United States Patent
Skutin et al.

(10) Patent No.: US 11,153,197 B2
(45) Date of Patent: Oct. 19, 2021

(54) PROTOCOL FOR DATA TRANSFER BETWEEN TWO NODES OF PARTIALLY CONNECTED LIMITED NETWORK

(71) Applicant: Twingate Inc., Redwood City, CA (US)

(72) Inventors: Alexey Skutin, Foster City, CA (US); Stanislav Ovsyannikov, Mountain View, CA (US); Igor Glotov, San Jose, CA (US); Valentin Shergin, Redwood City, CA (US)

(73) Assignee: Twingate Inc., Redwood City, CA (US)

( * ) Notice: Subject to any disclaimer, the term of this patent is extended or adjusted under 35 U.S.C. 154(b) by 174 days.

(21) Appl. No.: 15/219,289

(22) Filed: Jul. 26, 2016

(65) Prior Publication Data

US 2018/0034937 A1 Feb. 1, 2018

(51) Int. Cl.
*H04L 12/761* (2013.01)
*H04L 12/751* (2013.01)
*H04L 12/725* (2013.01)

(52) U.S. Cl.
CPC ............ *H04L 45/16* (2013.01); *H04L 45/02* (2013.01); *H04L 45/306* (2013.01)

(58) Field of Classification Search
None
See application file for complete search history.

(56) References Cited

U.S. PATENT DOCUMENTS

| | | | | |
|---|---|---|---|---|
| 6,044,075 | A * | 3/2000 | Le Boudec | H04L 45/00 370/234 |
| 2006/0193333 | A1 * | 8/2006 | Baughan | H04L 45/02 370/400 |
| 2010/0296515 | A1 * | 11/2010 | Kishi | H04L 67/125 370/395.53 |
| 2014/0108650 | A1 * | 4/2014 | Asnis | H04L 67/1008 709/224 |
| 2014/0302907 | A1 * | 10/2014 | Veverka | G06Q 50/34 463/17 |

* cited by examiner

*Primary Examiner* — Mohamed Ibrahim
(74) *Attorney, Agent, or Firm* — David R. Stevens; Stevens Law Group

(57) ABSTRACT

Protocol and associated system for data transfer between two nodes of partially connected limited network. In a data network, a hybrid solution is proposed that allows isolated clients to communicate via a dynamically configured group of connected clients. In some cases, this solution makes it possible to substantially reduce the number of isolated clients.

20 Claims, 6 Drawing Sheets

PROTOCOL FOR DATA TRANSFER BETWEEN TWO NODES OF PARTIALLY CONNECTED LIMITED NETWORK

BACKGROUND OF THE INVENTION

Field of the Invention

The present invention relates generally to computer networking technology. More particularly, the invention provides a protocol for data transfer between two nodes of partially connected limited network.

Description of the Related Art

As it is well known in the art, the infrastructure of the Internet has been devised with a view to enable openness and full connectivity of the network and make it possible to establish connections between any two nodes of the network. However, under present conditions, there are artificial limitations on network connectivity that users need to overcome. The existing methods of circumventing these limitations are of rather limited functionality and are incapable of solving this problem to a satisfactory degree.

A client-server network architecture well known to persons of ordinary skill in the art is the dominant Internet architecture, which is fully centralized. As would be appreciated by persons of skill in the art, in this network architecture, server accessibility is difficult to ensure when clients are blocked in a targeted manner.

The second type of well-known network architecture is P2P (Peer-to-Peer) network. A Tor network is a group of volunteer-operated servers that allows people to improve their privacy and security on the Internet. This type of peer-to-peer network is fully decentralized and has a limited number of infrequently changed bootstrap-nodes. In addition, Tor network has a small number of exit nodes, which are of limited capacity. The aforesaid exit nodes can be controlled by anyone. The Tor network is intended mostly for internal services (e.g. onion). Another example of peer-to-peer network is I2P network, which is, like tore is also fully decentralized. The I2P network is intended mostly for internal services (i2p).

FIG. 1 depicts the standard client-server architecture in the form of a network of interconnected nodes represented by a "star"-type directed incomplete graph. The general topology of this network is designated in FIG. 1 by numeral 100. In FIG. 1, numeral 110 designates a client, which is a leaf node. The number of such leaves is unlimited. The client is not aware of other leaf nodes. The client can be turned on and off at arbitrary times, thereby dynamically changing the topology of the network. Element 120 in FIG. 1 is a server, which is a specific fixed node of the network, whose presence (address) is known to all the clients. Element 130 in FIG. 1 is a graph edge linking adjacent clients and servers. An edge is identical to a communication channel between a client and a server. The direction of the edge corresponds to the direction of data transmission.

Element 140 in FIG. 1 designates a missing or incomplete edge. Element 150 in FIG. 1 is an isolated client. As would be appreciated by persons of ordinary skill in the art, missing or incomplete edges (140) prevent clients from exchanging data (130) with the server (120). The corresponding clients are considered to be isolated and disabled (150). In some cases, isolated clients may represent a substantial percentage of the total number of clients.

As would be appreciated by persons of ordinary skill in the art, in order to achieve improved network performance, it would be highly desirable to reduce the number of isolated clients. Thus, there is a strong need for systems and methods for reducing the number of isolated clients in a data network.

SUMMARY OF THE INVENTION

The embodiments described herein are directed to methods and systems that substantially obviate one or more of the above and other problems associated with conventional networking technology.

In accordance with one aspect of the embodiments described herein, there is provided a data network comprising: a plurality of server nodes, each of the plurality of server nodes being associated with a server node address; a plurality of client nodes, each client node of the plurality of client nodes storing the server node address, wherein at least one of the plurality of client nodes is a relay node capable of receiving and transmitting data between other nodes of the data network; a graph edge linking a client node from the plurality of client nodes and an adjacent server node from the plurality of server nodes, wherein the graph edge comprises a communication channel between the client node and the server node and wherein the direction of the graph edge corresponds to a direction of data transmission between the client node and the server node; at least one broker node storing a list of currently active relay nodes, the broker node being associated with a broker node address; and one or more server-broker graph edges, wherein each broker is associated with a separate server-broker graph edge configured for updating the list of currently active relay nodes.

In one or more embodiments, upon disconnection of the relay node from the network, the relay node is removed from the list of currently active relay nodes stored by the broker.

In one or more embodiments, a client node from the plurality of client nodes is configured to test whether the client node is adjacent to a server node from the plurality of server nodes.

In one or more embodiments, the client node from the plurality of client nodes is configured to test whether the client node is adjacent to a server node from the plurality of server nodes by sending a test packet to the server node.

In one or more embodiments, upon receiving the test packet from the client, the server node is configured to send a reply packet to the client and wherein upon receiving the reply packet from the server, the client determines that the server is adjacent to the client.

In one or more embodiments, if no response to the sent test packet is received by the client from the server within a predetermined amount of time, the client determines that the server is not adjacent to the client.

In one or more embodiments, each of the plurality of client nodes periodically sends information about its presence to all of the broker nodes known to the client node.

In one or more embodiments, if a broker does not receive the information about client's presence from the client, the broker marks that client as inactive.

In one or more embodiments, one of the plurality of client nodes is configured to check adjacent client nodes of the plurality of client nodes for use as a relay node.

In one or more embodiments, if one of the plurality of client nodes determines that an adjacent client node of the plurality of client nodes is a relay node, the one of the plurality of client nodes is configured to route a data transmission path through the relay node.

In accordance with another aspect of the embodiments described herein, there is provided a method for operating a data network comprising: providing a plurality of server nodes, each of the plurality of server nodes being associated with a server node address; providing a plurality of client nodes, each client node of the plurality of client nodes storing the server node address, wherein at least one of the plurality of client nodes is a relay node capable of receiving and transmitting data between other nodes of the data network; providing a graph edge linking a client node from the plurality of client nodes and an adjacent server node from the plurality of server nodes, wherein the graph edge comprises a communication channel between the client node and the server node and wherein the direction of the graph edge corresponds to a direction of data transmission between the client node and the server node; providing at least one broker node storing a list of currently active relay nodes, the broker node being associated with a broker node address; and providing one or more server-broker graph edges, wherein each broker is associated with a separate server-broker graph edge configured for updating the list of currently active relay nodes.

In one or more embodiments, upon disconnection of the relay node from the network, the relay node is removed from the list of currently active relay nodes stored by the broker.

In one or more embodiments, a client node from the plurality of client nodes is configured to test whether the client node is adjacent to a server node from the plurality of server nodes.

In one or more embodiments, the client node from the plurality of client nodes is configured to test whether the client node is adjacent to a server node from the plurality of server nodes by sending a test packet to the server node.

In one or more embodiments, upon receiving the test packet from the client, the server node is configured to send a reply packet to the client and wherein upon receiving the reply packet from the server, the client determines that the server is adjacent to the client.

In one or more embodiments, if no response to the sent test packet is received by the client from the server within a predetermined amount of time, the client determines that the server is not adjacent to the client.

In one or more embodiments, each of the plurality of client nodes periodically sends information about its presence to all of the broker nodes known to the client node.

In one or more embodiments, if a broker does not receive the information about client's presence from the client, the broker marks that client as inactive.

In one or more embodiments, one of the plurality of client nodes is configured to check adjacent client nodes of the plurality of client nodes for use as a relay node.

In one or more embodiments, if one of the plurality of client nodes determines that an adjacent client node of the plurality of client nodes is a relay node, the one of the plurality of client nodes is configured to route a data transmission path through the relay node.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference is made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

In accordance with one aspect of the concepts described herein, there are provided systems and methods aimed at reducing the number of isolated leaves by allowing such clients to communicate via a group of other clients. The inventive systems and methods will be described in detail below.

Figure 1:
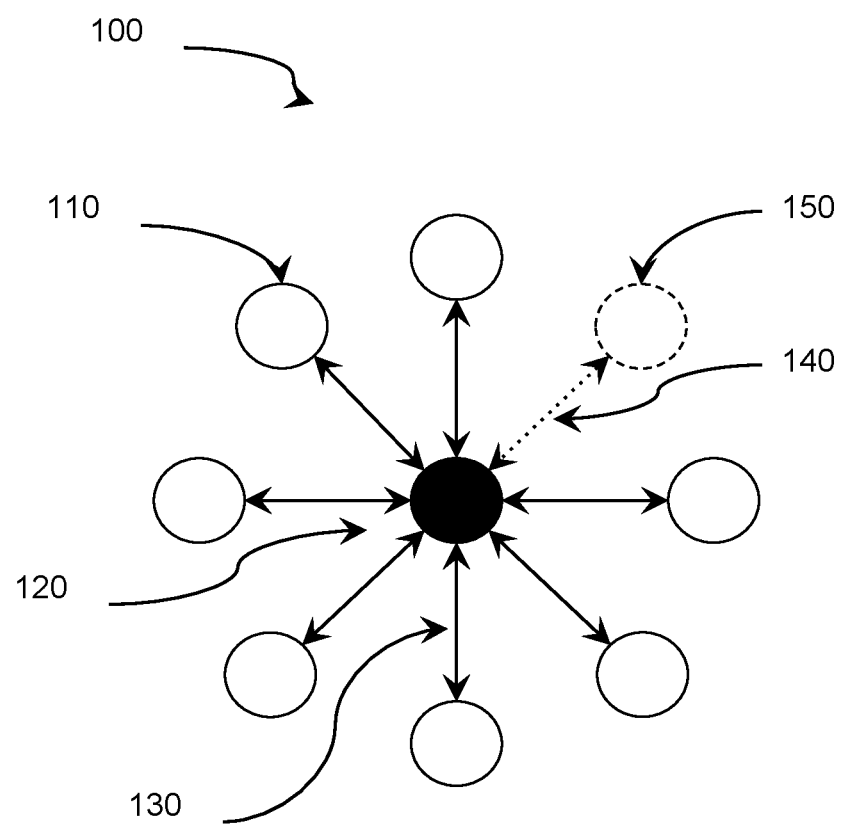
FIG. 1 depicts the standard Client-Server architecture in the form of a network of interconnected nodes represented by a "star"-type directed incomplete graph.
Figure 2:
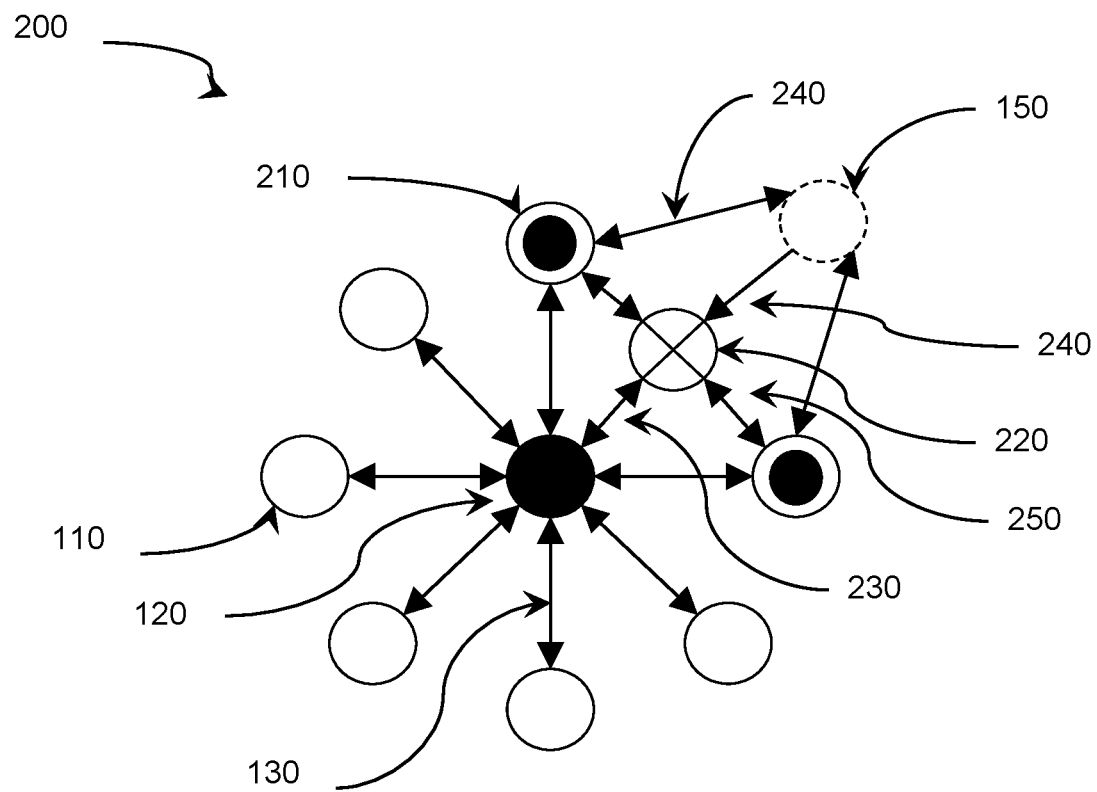
FIG. 2 depicts an exemplary embodiment of a modified client-server architecture in accordance with the invention described herein.

FIG. 2 depicts an exemplary embodiment 200 of a modified client-server architecture in accordance with the invention described herein. The exemplary architecture additionally includes one or more of the following elements. In one or more exemplary embodiments, element 210 in FIG. 2 is a relay node, which is a client capable of receiving and transmitting data between other nodes of the network. In one or more exemplary embodiments, element 220 in FIG. 2 is a broker, which is an additional service node of the network storing a list of currently active relays. In one or more embodiments, the overall network can have several brokers 220. All the clients (110) are aware of the presence of the brokers 220 and their network addresses.

In one or more exemplary embodiments, element 230 in FIG. 2 is a server-broker graph edge. This edge is guaranteed to exist in the network for each broker (220) and is intended for the timely updating of the list of relays active in the network. In one or more exemplary embodiments, element 240 in FIG. 2 is a client-broker graph edge, which is a channel for data exchange between a client (110) and a broker (220). In one or more exemplary embodiments, the aforesaid edge may be incomplete.

Figure 3:
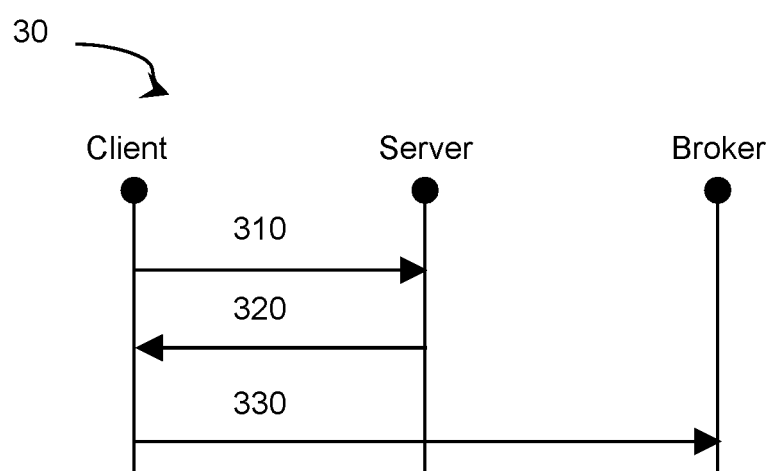
FIG. 3 illustrates an exemplary embodiment of a step 1 of an algorithm for data transmission between an isolated client (110) and a server (120).

FIG. 3 illustrates an exemplary embodiment 30 of a step 1 of an algorithm for data transmission between an isolated client (110) and a server (120). In one or more exemplary embodiments, this step 1 involves checking if the client (110) and server (120) are adjacent.

In one or more exemplary embodiments, at step 310 shown in FIG. 3 the client (110) sends a test packet to the server (120). If the server receives the packet from the client (110), it then sends a reply packet to the client (step 320).

In one or more exemplary embodiments, at step 320 shown in FIG. 3 the server (120) sends a reply packet to the client (110). If the reply packet is successfully received, the client (110) is considered adjacent to the server (the presence of a client-server edge (130) is confirmed), and packet exchange is considered feasible. If the client (110) has not received the reply packet from the server (120), then there are 3 possible causes:

The "client-server" (310) edge is missing.
The "server-client" edge (320) edge is missing.
Both the "client-server" edge (310) and the "server-client" edges (320) are missing.

At the same time, in the absence of a response from the server (120), the client (110) cannot determine which of the above-mentioned causes is true.

In one or more exemplary embodiments, a server response wait time dT1 is established as part of our protocol. If no response (step 320) arrives during the aforesaid time dT1, it is assumed that the client (110) and server (120) are non-adjacent and the edge is either missing or incomplete (140).

In one or more exemplary embodiments, at step 330 shown in FIG. 3, the client (110) sends information about its presence to the brokers (220) that it is aware of during each dT period. This edge tells the brokers (220) that the client (110) is in the active state. If for any reason the broker (220) stops receiving information about the client (110), then the broker (220) considers this node to be inactive.

Figure 4:
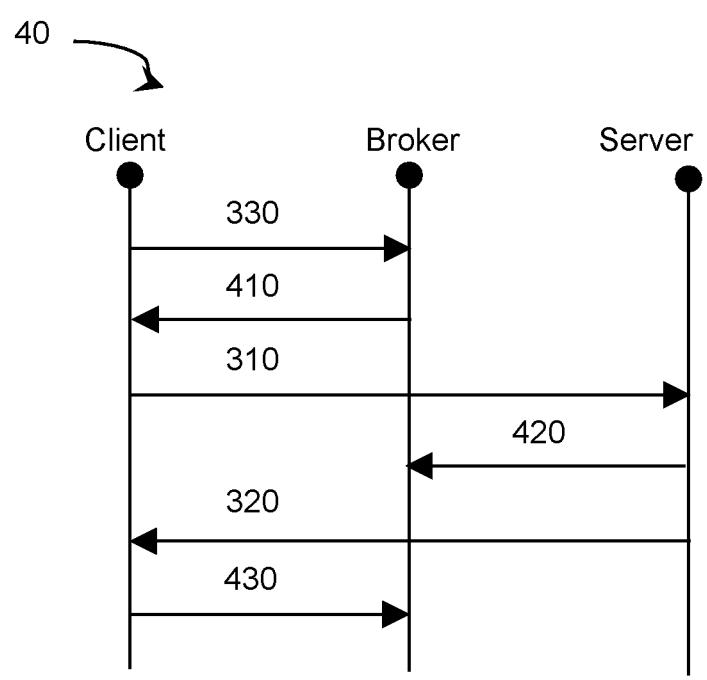
FIG. 4 illustrates an exemplary embodiment of a step 2 of an algorithm for data transmission between an isolated client (110) and a server (120).

FIG. 4 illustrates an exemplary embodiment 40 of a step 2 of an algorithm for data transmission between an isolated client (110) and a server (120). This step 2 involves checking the adjacent client for use as a relay. In one or more exemplary embodiments, checking the client (110) for relay (210) use involves checking whether packets can be received from other clients, i.e. performing a packet forwarding (250) check. In one or more embodiments, the broker (element 220) performs this check by emulating an isolated client (150).

In one or more exemplary embodiments, at step 410 shown in FIG. 4, the broker (220) sends a packet to the server (120) via the client (110). If the client (110) receives this packet, it forwards (310) the packet to the server on its own. Subsequently, the client (110) waits for a response (320) from the server during time dT1. The server (120) sees that the packet has been received from the client (110) and, in addition, that this packet is addressed to the broker (220).

In one or more exemplary embodiments, at step 420 shown in FIG. 4 the server sends a reply packet to the broker (220). The server (120) also sends (320) a reply packet to the client (110).

In one or more exemplary embodiments, at step 430 shown in FIG. 4, if the client has received a reply packet from the server, it forwards the packet back to the broker (220). The broker (220) waits for a response from the client (110) and from the broker (220) during time dT2. If the broker (220) receives a response from the client (110) or from the Broker during time dT2, then this client (110) is registered as a (210).

Relay expiry will now be described. Based on the original assumptions of our topology, we have determined that the client can randomly disconnect from the network. If this client is a relay, then its random disconnection from the network makes the relay unavailable for transferring data from isolated clients. Such a relay is considered expired and must be removed from the broker database. Technically, a client (110) is taken off the list of active s when messages regarding its activity (330) stop arriving from it. In this manner, the broker database stores only live relays.

Figure 5:
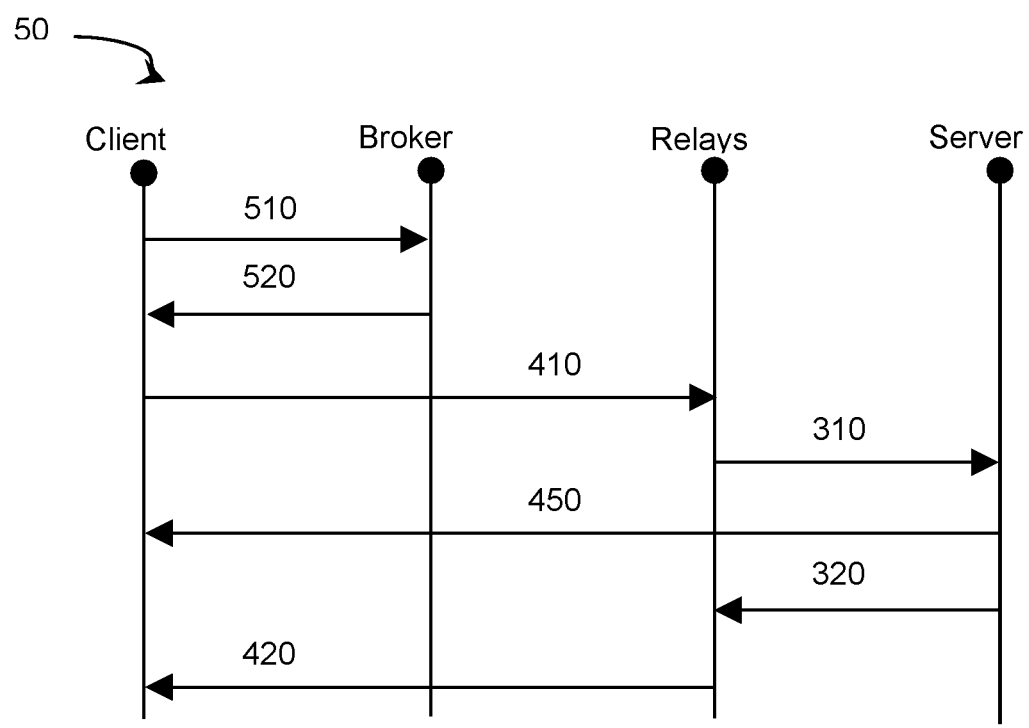
FIG. 5 illustrates an exemplary embodiment of a step 3 of an algorithm for data transmission between an isolated client (110) and a server (120).

FIG. 5 illustrates an exemplary embodiment 50 of a step 3 of an algorithm for data transmission between an isolated client (110) and a server (120). This step 2 involves path routing through the relay.

In one or more exemplary embodiments, at step 510 shown in FIG. 5, the isolated client (150) requests a list of relays (210) from all the brokers (220) it is aware of. The number of brokers (220) in the network is not explicitly defined.

In one or more exemplary embodiments, at step 520 shown in FIG. 5 is a list of relays (210) available for packet forwarding is obtained. If the client (110) does not receive a list of relays (210) from any of the brokers (220), then building a circuit with the server is considered impossible. The protocol ends in a "no network" status. If the list of relays is not empty, then the client (110) sends a packet (410) to all the relays (210) on the received list.

Figure 6:
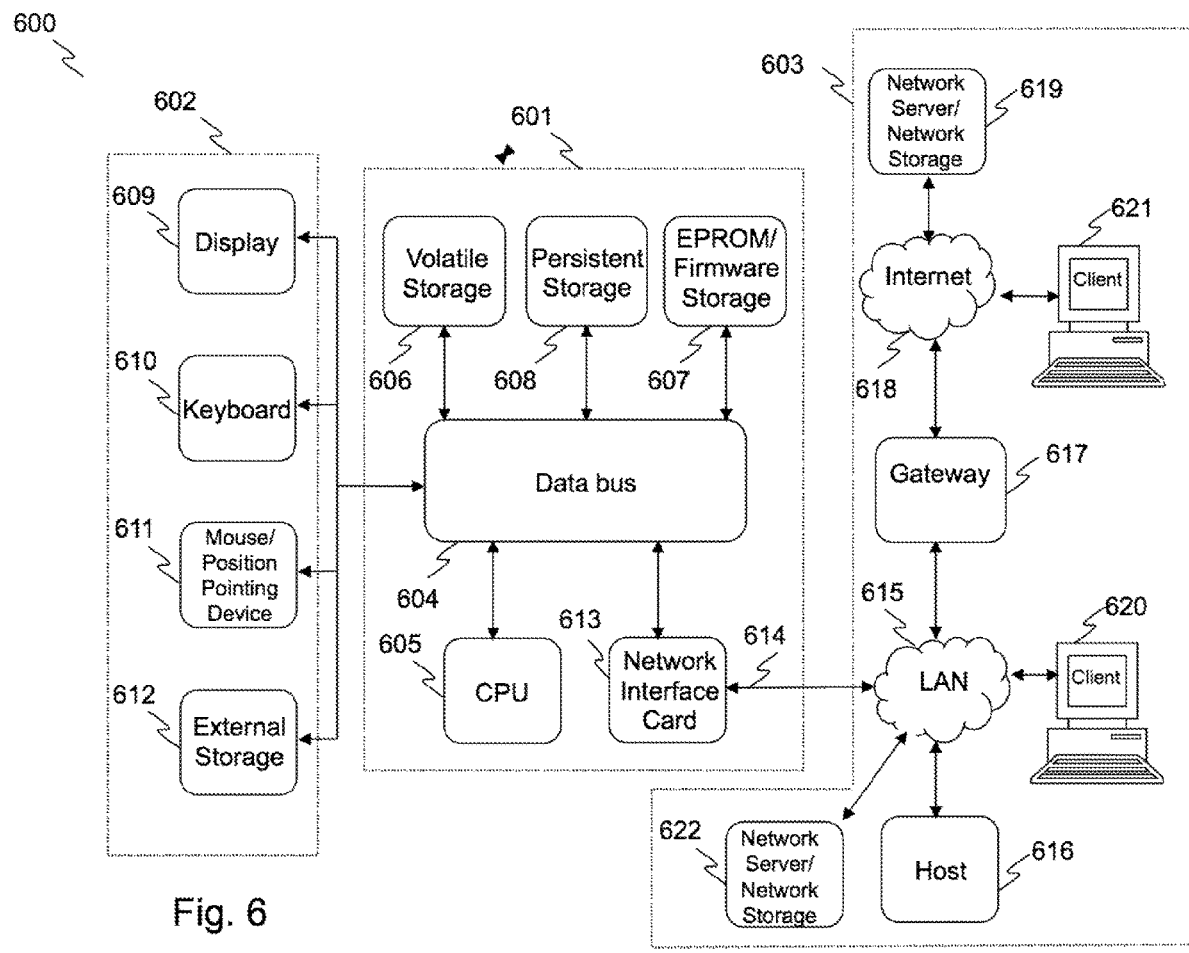
FIG. 6 is a block diagram that illustrates an exemplary embodiment of a computer system 600 upon which the described invention may be deployed.

FIG. 6 is a block diagram that illustrates an exemplary embodiment of a computer system 600 upon which the described invention may be deployed. The system 600 includes a computer platform 601, peripheral devices 602 and network resources 603.

The computer platform 601 may include a data bus 604 or other communication mechanism for communicating information across and among various parts of the computer platform 601, and a processor 605 coupled with bus 604 for processing information and performing other computational and control tasks. Computer platform 601 also includes a volatile storage 606, such as a random access memory (RAM) or other dynamic storage device, coupled to bus 604 for storing various information as well as instructions to be executed by processor 605, including the software application for proxy detection described above. The volatile storage 606 also may be used for storing temporary variables or other intermediate information during execution of instructions by processor 605. Computer platform 601 may further include a read only memory (ROM or EPROM) 607 or other static storage device coupled to bus 604 for storing static information and instructions for processor 605, such as basic input-output system (BIOS), as well as various system configuration parameters. A persistent storage device 608, such as a magnetic disk, optical disk, or solid-state flash memory device is provided and coupled to bus 604 for storing information and instructions.

Computer platform 601 may be coupled via bus 604 to a touch-sensitive display 109, such as a cathode ray tube (CRT), plasma display, or a liquid crystal display (LCD), for displaying information to a system administrator or user of the computer platform 601. An input device 610, including alphanumeric and other keys, is coupled to bus 604 for communicating information and command selections to processor 605. Another type of user input device is cursor control device 611, such as a mouse, a trackball, or cursor direction keys for communicating direction information and command selections to processor 605 and for controlling cursor movement on touch-sensitive display 609. This input device typically has two degrees of freedom in two axes, a first axis (e.g., x) and a second axis (e.g., y), that allows the device to specify positions in a plane. To detect user's gestures, the display 609 may incorporate a touchscreen interface configured to detect user's tactile events and send information on the detected events to the processor 605 via the bus 604.

An external storage device 612 may be coupled to the computer platform 601 via bus 604 to provide an extra or removable storage capacity for the computer platform 601. In an embodiment of the computer system 600, the external removable storage device 612 may be used to facilitate exchange of data with other computer systems.

The invention is related to the use of computer system 600 for implementing the techniques described herein. In an embodiment, the inventive system may reside on a machine such as computer platform 601. According to one embodiment of the invention, the techniques described herein are performed by computer platform 601 in response to processor 605 executing one or more sequences of one or more instructions contained in the volatile memory 606. Such instructions may be read into volatile memory 606 from another computer-readable medium, such as persistent storage device 608. Execution of the sequences of instructions contained in the volatile memory 606 causes processor 605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 605 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 608. Volatile media includes dynamic memory, such as volatile storage 606.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 605 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 604. The bus 604 carries the data to the volatile storage 606, from which processor 605 retrieves and executes the instructions. The instructions received by the volatile memory 606 may optionally be stored on persistent storage device 608 either before or after execution by processor 605. The instructions may also be downloaded into the computer platform 601 via Internet using a variety of network data communication protocols well known in the art.

The computer platform 601 also includes a communication interface, such as network interface card 613 coupled to the data bus 604. Communication interface 613 provides a two-way data communication coupling to a network link 614 that is coupled to a local network 615. For example, communication interface 613 may be an integrated services digital network (ISDN) card or a modem to provide a data communication connection to a corresponding type of telephone line. As another example, communication interface 613 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 613 sends and receives electrical, electromagnetic or optical signals that carry digital data streams representing various types of information.

Network link 614 typically provides data communication through one or more networks to other network resources. For example, network link 614 may provide a connection through local network 615 to a host computer 616, or a network storage/server 622. Additionally or alternatively, the network link 614 may connect through gateway/firewall 617 to the wide-area or global network 618, such as an Internet. Thus, the computer platform 601 can access network resources located anywhere on the Internet 618, such as a remote network storage/server 619. On the other hand, the computer platform 601 may also be accessed by clients located anywhere on the local area network 615 and/or the Internet 618. The network clients 260 and 261 may themselves be implemented based on the computer platform similar to the platform 601.

Local network 615 and the Internet 618 both use electrical, electromagnetic or optical signals that carry digital data streams. The signals through the various networks and the signals on network link 614 and through communication interface 613, which carry the digital data to and from computer platform 601, are exemplary forms of carrier waves transporting the information.

Computer platform 601 can send messages and receive data, including program code, through the variety of network(s) including Internet 618 and LAN 615, network link 615 and communication interface 613. In the Internet example, when the system 601 acts as a network server, it might transmit a requested code or data for an application program running on client(s) 260 and/or 261 through the Internet 618, gateway/firewall 617, local area network 615 and communication interface 613. Similarly, it may receive code from other network resources.

The received code may be executed by processor 605 as it is received, and/or stored in persistent or volatile storage devices 608 and 606, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the protocol and associated system for data transfer between two nodes of partially connected limited network. It is intended that the specification and examples be considered as exemplary only, with a true scope and spirit of the invention being indicated by the following claims.

What is claimed is:

1. A data network comprising:
   b. a plurality of server nodes, each of the plurality of server nodes being associated with a server node address;
   a. a plurality of client nodes, each client node of the plurality of client nodes storing the server node address, wherein at least one of the plurality of client nodes is a relay node capable of receiving and transmitting data between other nodes of the data network;
   c. a graph edge linking a client node from the plurality of client nodes and an adjacent server node from the plurality of server nodes, wherein the graph edge comprises a communication channel between the client node and the adjacent server node and wherein the a direction of the graph edge corresponds to a direction of data transmission between the client node and the adjacent server node;
   g. at least one broker node storing a list of currently active relay nodes; and
   h. one or more server-broker graph edges, wherein each broker node is associated with a separate server-broker graph edge configured for updating the list of currently active relay nodes;
   wherein the at least one broker node is programmed to identify a client node of the plurality of client nodes as one of the currently active relay nodes by:
     transmitting a packet to a server of the plurality of server nodes by way of the client node; and
     receiving a reply to the packet from the server and receiving a forwarded reply to the packet from the server by way of the client node.

2. The data network of claim 1, wherein a client node from the plurality of client nodes is configured to test whether the client node is adjacent to a server node from the plurality of server nodes.

3. The data network of claim 2, wherein the client node from the plurality of client nodes is configured to test whether the client node is adjacent to a server node from the plurality of server nodes by sending a test packet to the server node.

4. The data network of claim 3, wherein upon receiving the test packet from the client, the server node is configured to send a reply packet to the client and wherein upon receiving the reply packet from the server, the client determines that the server is adjacent to the client.

5. The data network of claim 3, wherein if no response to the sent test packet is received by the client from the server within a predetermined amount of time, the client determines that the server is not adjacent to the client.

6. The data network of claim 1, wherein each of the plurality of client nodes periodically sends information about its presence any of the at least one broker nodes known to the client node.

7. The data network of claim 6, wherein if a broker does not receive the information about client's presence from the client, the at least one broker node marks that client as inactive.

8. The data network of claim 1, wherein one of the plurality of client nodes is configured to check adjacent client nodes of the plurality of client nodes for use as a relay node.

9. The data network of claim 8, wherein if one of the plurality of client nodes determines that an adjacent client node of the plurality of client nodes is the relay node, the one of the plurality of client nodes is configured to route a data transmission path through the relay node.

10. The data network of claim 1, wherein upon disconnection of the relay node from the data network, the relay node is removed from the list of currently active relay nodes stored by the at least one broker node.

11. A method for operating a data network comprising:
    b. providing a plurality of server nodes, each of the plurality of server nodes being associated with a server node address;
    a. providing a plurality of client nodes, each client node of the plurality of client nodes storing the server node address, wherein at least one of the plurality of client nodes is a relay node capable of receiving and transmitting data between other nodes of the data network;
    c. providing a graph edge linking a client node from the plurality of client nodes and an adjacent server node from the plurality of server nodes, wherein the graph edge comprises a communication channel between the client node and the adjacent server node and wherein a direction of the graph edge corresponds to a direction of data transmission between the client node and the adjacent server node;
    g. providing at least one broker node storing a list of currently active relay nodes; and
    h. providing one or more server-broker graph edges, wherein each broker node is associated with a separate server-broker graph edge configured for updating the list of currently active relay nodes;
    wherein the at least one broker node is programmed to identify a client node of the plurality of client nodes as one of the currently active relay nodes by:
      transmitting a packet to a server of the plurality of server nodes by way of the client node; and receiving a reply to the packet from the server and receiving a forwarded reply from the server by way of the client node.

12. The method for operating the data network of claim 11, wherein a client node from the plurality of client nodes is configured to test whether the client node is adjacent to a server node from the plurality of server nodes.

13. The method for operating the data network of claim 12, wherein the client node from the plurality of client nodes is configured to test whether the client node is adjacent to a server node from the plurality of server nodes by sending a test packet to the server node.

14. The method for operating the data network of claim 13, wherein upon receiving the test packet from the client, the server node is configured to send a reply packet to the client and wherein upon receiving the reply packet from the server, the client determines that the server is adjacent to the client.

15. The method for operating the data network of claim 13, wherein if no response to the sent test packet is received by the client from the server within a predetermined amount of time, the client determines that the server is not adjacent to the client.

16. The method for operating the data network of claim 11, wherein each of the plurality of client nodes periodically sends information about its presence to any of the at least one broker nodes known to the client node.

17. The method for operating the data network of claim 16, wherein if a broker does not receive the information about client's presence from the client, the at least one broker node marks that client as inactive.

18. The method for operating the data network of claim 11, wherein one of the plurality of client nodes is configured to check adjacent client nodes of the plurality of client nodes for use as a relay node.

19. The method for operating the data network of claim 18, wherein if one of the plurality of client nodes determines that an adjacent client node of the plurality of client nodes is the relay node, the one of the plurality of client nodes is configured to route a data transmission path through the relay node.

20. The method for operating the data network of claim 11, wherein upon disconnection of the relay node from the data network, the relay node is removed from the list of currently active relay nodes stored by the at least one broker node.

* * * * *